United States Patent [19]

Cofer

[11] Patent Number: 4,662,610
[45] Date of Patent: May 5, 1987

[54] FOLDING TRAILER JACK STAND

[75] Inventor: Archie Cofer, Waurika, Okla.

[73] Assignee: Wan Edwin Moore, Nicoma Park, Okla.

[21] Appl. No.: 836,879

[22] Filed: Mar. 6, 1986

[51] Int. Cl.⁴ .............................................. B60S 9/20
[52] U.S. Cl. .................................... 254/420; 254/423
[58] Field of Search ........................... 254/418-420, 254/423-427, 45; 280/475, 763.1, 764.1, 765.1, 766.1

[56] References Cited

U.S. PATENT DOCUMENTS

| 2,837,312 | 6/1958 | Troche | 254/423 |
| 4,071,147 | 1/1978 | Hornagold | 280/766.1 |
| 4,169,579 | 10/1979 | Moll | 254/420 X |

FOREIGN PATENT DOCUMENTS 551157 2/1958 Italy .................................... 254/423

Primary Examiner—Frederick R. Schmidt
Assistant Examiner—Steven P. Schad
Attorney, Agent, or Firm—Robert K. Rhea

[57] ABSTRACT

A jack stand or support for a trailer jack having a vertically extending housing and an extensible plunger telescopically contained by the depending end of the jack housing includes an upright member mounted on a flat base. A sleeve-like socket, in which the upper end of the upright member is telescopically received, is secured to the depending end of the jack plunger. The socket member is pivotally mounted in elongated slots formed in parallel strap members secured to the upright member for a lateral pivoting movement of the jack stand to a stored travel position by rollers on the strap members contacting forwardly and rearwardly extending arcuate tracks, mounted on the jack housing, during retracting movement of the plunger into the housing.

6 Claims, 3 Drawing Figures

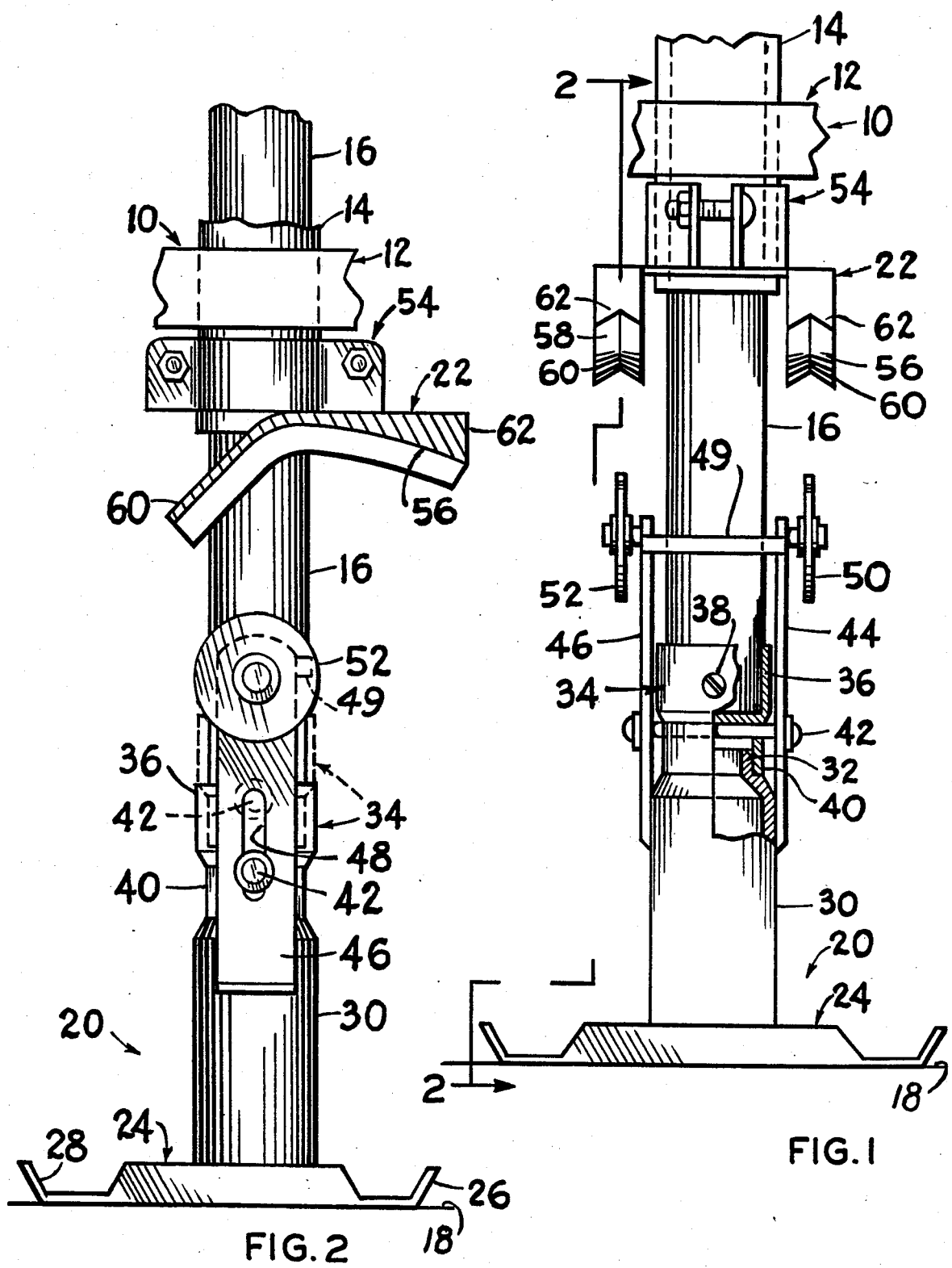

FOLDING TRAILER JACK STAND

BACKGROUND OF THE INVENTION

1. Field of the Invention

The present invention relates to trailers and more particularly to a supporting platform or stand for the trailer jack on a trailer tongue.

The tongue of a two-wheel trailer is conventionally provided with a trailer jack having a telescoping portion extended vertically downward from the trailer tongue to support and/or level the forward end portion of the trailer, such as when the trailer comprises a mobile home. Since this trailer jack extension telescope portion is cylindrical and of relatively small diameter, for example, two inches, it is usually necessary to provide an underlying planar section, such as lumber or metal, having dimensions substantially greater than the jack extension cross section dimension to prevent its penetration of the earth as a result of the mass of the trailer.

2. Description of the Prior Art

With the above type trailer jack on a trailer tongue, it has been common practice to provide one or a plurality of wooden planks or blocks to underlie the depending end of the jack extension, however, this has the disadvantage that these block units are not easily and conveniently stored for travel and by age and weathering tend to deteriorate and eventually crack or split.

The most pertinent prior U.S. Pat. Nos. is believed to be 3,957,249 and 4,078,774. Both of these patents disclose a trailer jack foot effectively extending the length of the jack and includes a self-storing feature formed by U-shaped anchor arms which engages a portion of the jack below the trailer tongue, as in U.S. Pat No. 3,957,249, or which engages a depending portion of the trailer tongue A-frame as in U.S. Pat. No. 4,078,774. In both cases the jack extension is secured to the trailer jack when in travel position by downward pressure of the trailer jack plunger on the platform base of the jack foot or stand.

This invention is distinctive over prior patents, such as the above named patents, by providing a trailer jack foot for effectively extending the length of the jack and providing a foundation therefor in which the jack stand is pivotally secured to the jack in a manner to be axially aligned therewith by gravity when lowering the jack foot or during its initial upward movement toward a stored position. The pivoting connection acts to pivot the major portion of the jack foot to a substantially horizontal out-of-the-way travel position when not in use.

SUMMARY OF THE INVENTION

A normally horizontal metallic platform of selected dimensions is provided with an upstanding cylindrical post having a diametrically reduced upper end portion. An open end cylindrical socket member telescopically receives the reduced upper end portion of the post at one end and telescopically receives the depending end portion of a trailer jack extension at its other end. A pin extends diametrically through the socket member and is slidably received at its respective end portions within vertical slots formed in a pair of straps secured at their depending end portions in diametric opposition on the upper end portion of the post and projecting upwardly at their other end portions above the upper limit of the socket member. A pair of wheels are respectively journalled in parallel outwardly directed opposition by the upper end portion of the pair of straps. A track member is clamped to the depending end portion of the jack housing below the trailer tongue by a clamp and includes a pair of parallel guides or tracks disposed in the travel path of the pair of wheels when the jack extension is retracted. Each of the tracks presents an arcuate path along which the respective wheel rolls to pivot the platform and post to a lateral generally horizontal position rearwardly of the vertical axis of the jack when the trailer is in travel position behind a towing vehicle. Downward movement of the trailer jack extension pivots the platform and post to a trailer jack supporting position when the trailer is again parked.

The principal object of this invention is to provide a trailer jack foot which may be permanently connected with a trailer jack to support the latter when in parked position and which automatically pivots to a generally horizontal position when the trailer jack is lifted to a travel position.

BRIEF DESCRIPTION OF THE DRAWINGS

FIG. 1 is a front elevational view of the device, partially in section, in operative position on a trailer jack connected with a trailer tongue, only a fragment of the latter being shown;

FIG. 2 is a view looking in the direction of the arrows 2—2 of FIG. 1 illustrating, by dotted lines, the trailer jack extension supporting socket being lifted off the platform post; and, FIG. 3 is a view similar to FIG. 2 with parts broken away and sectioned for clarity and illustrating, by dotted lines, the device in trailer travel position.

DESCRIPTION OF THE PREFERRED EMBODIMENTS

Figure 3:
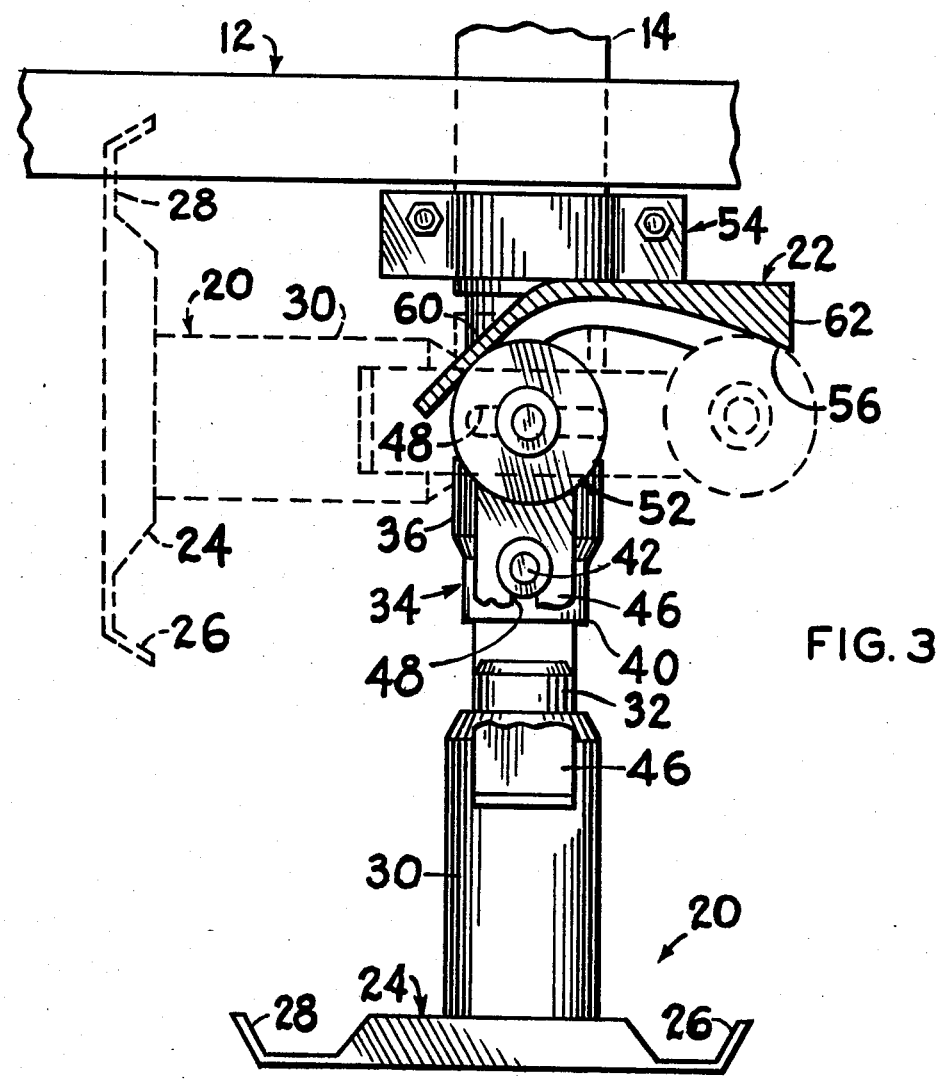

Like characters of reference designate like parts in those figures of the drawings in which they occur.

In the drawings:

The reference numeral 10 indicates a conventional trailer jack mounted on the forward end portion of an A-frame trailer tongue 12 in a substantially conventional manner. The trailer jack includes a vertical outer housing 14 which projects at its depending end through the trailer tongue 12 and telescopically receives a trailer jack depending end extension or plunger portion 16. The plunger 16 is moved vertically by a manual or electrically operated mechanical means, neither being shown. The depending end of the plunger 16 normally engages the surface of the earth, indicated at 18, when supporting the trailer tongue when the trailer to which it is connected, not shown, is in a parked position. When the trailer is in a travel position, the plunger 16 is retracted into the jack housing 14 so that a minimum portion of the plunger projects below the horizontal limit of the trailer tongue for reasons believed obvious. The above description is conventional and is set forth to show the combination with which the present invention is used.

The trailer jack stand or jack foot basically comprises two parts, a base part or stand being generally indicated at 20, and a top or track portion, indicated generally at 22. The base portion comprises a generally rectangular planar platform 24 having forward and rearward upturned edges 26 and 28. An upstanding cylindrical post 30 is rigidly mounted on the platform 24 preferably offset from the platform center toward the forward upturned edge 26 for the purposes presently explained.

Diametrically the post 30 is at least equal to and preferably slightly greater than the diameter of the jack plunger 16. The upper end portion of the post 30 is diametrically reduced, as at 32. A step diameter sleeve-like socket member 34 is coaxially interposed between the post 30 and jack plunger 16. The socket member comprises a top end portion 36 which nests the depending end portion of the jack plunger 16 and is normally secured thereto, as by a screw 38. The other or diametrically smaller portion 40 of the socket member receives the diametrically reduced end portion 32 of the post.

An elongated pin 42 extends diametrically through the socket member 34 at approximately the juncture of its step diameter end portions for the purposes presently explained.

A pair of strap metal members 44 and 46 are vertically disposed on diametrically opposing sides of the post and are secured, as by welding their depending end portion to the upper end portion of the post below its diametrically reduced end portion 32. The length of the straps is such that they project above the normally downward limit of the socket member 34 a distance substantially equal to the length of the socket member. The straps are each provided with a vertical elongated slot 48, only one being shown, through which respective end portions of the pin 42 project thus permitting vertical movement of the socket member 34 relative to the straps 44-46. The vertical length of the slots 48 is such that, when the jack plunger 16 lifts the socket member to the upper limit of the pin 42, within the slots 48, the depending end portion of the socket member 34 is spaced above the upper limit of the post reduced end portion 32 a distance permitting vertical forward to rearward horizontal swinging movement of the post and platform about the horizontal axis of the pin 42. The upper end portion of the straps 44 and 46 are transversely interconnected by a horizontal brace or stop bar 49 disposed forwardly of the plunger 16 for the purpose presently explained. The upper end portion of the straps 44 and 46 journal a pair of wheels or rollers 50 and 52, respectively, on horizontally aligned axes. The diameter of the rollers is selected and, in the example shown, is substantially equal to the diameter of the upper end portion 36 of the socket member. The purpose of the rollers 50-52 is to pivot the post and platform to a travel position, as presently explained.

The track means 22 comprises a split clamp means 54 which surrounds and grips the depending end portion of the jack housing 14. A pair of tracks 56 and 58 are respectively disposed in overlying relation above the position of the respective rollers 50 and 52. Each of the tracks 56-58 are characterized by an inverted V-shaped surface to insure that the rollers 50-52 remain within the confines of the respective track as the rollers move therealong. Each of the V-shaped track surfaces present an arcuate path, in side elevation (FIGS. 2 and 3), extending from a downward end portion 60 of each track in an upward and forward direction and terminating forwardly of the vertical axis of the jack, as at 62. The length of the track is such that the rollers contact the downward end portion 60 thereof as the jack plunger is moved upwardly and the rollers are disposed adjacent the forward end portion 62 of the track when the post and its platform are substantially horizontally disposed, as illustrated by dotted lines (FIG. 3).

Operation

Assume that the post 30 and its platform 24 have been connected in supporting relation with the jack plunger 16 and that the track means 22 is connected with the jack thereabove, as illustrated by FIG. 1. To retract the jack stand to a travel position, the jack is activated to lift its plunger 16 which initially separates the socket member 34 from the post 30. Upon further upward movement of the jack plunger 16, the rollers 50-52 contact the tracks 56-58 and as the plunger is further lifted, the post and its platform pivot rearwardly about the axis of the pin 42 as the rollers roll along the tracks to their forward limit of movement disposing the rearward flange 28 of the platform between the bars defining the A-frame configuration of the trailer tongue member 12. The jack 10 is then locked with the stand in this position.

To reposition the jack foot or stand, to the solid line position of FIG. 1, the jack plunger is simply lowered while the trailer tongue is connected with the towing vehicle. The post 30 and its platform pivots downwardly by gravity about the axis of the pin 42 until axially aligned with the jack and socket member 34, the downward pivoting movement being arrested by the bar stop 49 contacting the plunger 16. Further downward movement of the plunger 16 lowers the socket member into cooperative engagement with the post top reduced end portion 32 to support the mass of the trailer tongue.

Obviously the invention is susceptible to changes or alterations without defeating its practicability. Therefore, I do not wish to be confined to the preferred embodiment shown in the drawings and described herein.

I claim:

1. In combination with a trailer jack mounted on a trailer tongue, the trailer jack having a vertical housing and an extensible plunger movable vertically toward and away from the surface of the earth, the improvement comprising:
   a jack support including an upright member normally depending from said plunger for extending the effective length of the jack;
   a platform underlying said upright member;
   socket means normally axially interposed between said plunger and said upright member;
   strap and roller means rigidly connected with said upright member and pivotally connected with said socket means for vertical separating movement of said plunger with respect to said upright member in response to upward movement of said plunger and vertical pivoting movement of said jack support about a horizontal axis normal to the vertical axis of said plunger; and,
   track means transversely mounted on said jack housing and engaged by said roller means for pivoting said jack support to a horizontal stored travel position.

2. The combination according to claim 1 in which the socket means includes:
   a step diameter sleeve socket having a larger diameter end portion nesting and secured to the depending end portion of said plunger and having its other smaller diameter end portion normally nesting the upper end portion of said upright member.

3. The combination according to claim 2 in which the strap and roller means includes:

a pair of straps respectively supported by said upright member in diametric opposition and projecting above the upper limit of said socket means,
each strap of said pair of straps having a vertical slot intermediate its ends; and,
a pin extending transversely through said sleeve socket and the respective strap slot.

4. The combination according to claim 3 in which the track means includes:
a pair of parallel downwardly facing grooves tracks mounted on diametric opposite sides of said jack housing in the travel path of said rollers during upward movement of said plunger.

5. In combination with a trailer jack mounted on a trailer tongue, the trailer jack having a vertical housing and an extensible plunger movable vertically toward and away from the surface of the earth, the improvement comprising:
a jack support including an upright member normally depending from said plunger for extending the effective length of the jack;
a platform underlying said upright member;
socket means including a step diameter sleeve socket having a larger diameter end portion axially nesting and secured to the depending end portion of said plunger and having its other smaller diameter end portion normally axially nesting the upper end portion of said upright member;
a pair of straps connected with said upright member and projecting upwardly one opposing sides of said socket means,
each strap of said pair of straps having a longitudinal slot intermediate its ends,
the length of the slots being at least greater than the depth of penetration of the upright member into the socket means for permitting separation of the upright member from the socket means;
a pin extending transversely through the socket means and slidably received at its respective end portions by the slots in said straps for lifting said socket means off the upright member by upward movement of the plunger and vertical pivoting movement of said jack support about a horizontal axis normal to the vertical axis of said plunger;
a roller journalled by the end portion of each strap of said pair of straps opposite the upright member; and,
track means mounted on said jack housing and engaged by said rollers for pivoting said jack support to a horizontal stored travel position adjacent the trailer tongue by upward movement of said plunger.

6. The combination according to claim 5 in which the track means includes:
a pair of parallel downwardly facing groove tracks mounted on diametric opposite sides of said jack housing forming a travel path for said rollers during upward movement of said plunger.

* * * * *